(12) United States Patent
Miyashita

(10) Patent No.: US 7,699,502 B2
(45) Date of Patent: Apr. 20, 2010

(54) OPTICAL MEMBER AND LIGHTING DEVICE HAVING THE SAME

(75) Inventor: Junji Miyashita, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 60 days.

(21) Appl. No.: 12/062,966

(22) Filed: Apr. 4, 2008

(65) Prior Publication Data
US 2008/0253117 A1 Oct. 16, 2008

(30) Foreign Application Priority Data
Apr. 9, 2007 (JP) ............................. 2007-101393

(51) Int. Cl.
*F21V 5/00* (2006.01)
*F21V 5/08* (2006.01)

(52) U.S. Cl. ...................... 362/317; 362/326; 362/330; 362/331; 362/333; 362/520

(58) Field of Classification Search ................. 362/520, 362/516, 540, 327, 348, 610, 615, 511, 521, 362/522, 317, 326, 333, 800, 330, 331
See application file for complete search history.

(56) References Cited

U.S. PATENT DOCUMENTS 5,748,816 A * 5/1998 Jaksic et al. .................. 385/39
7,111,964 B2 * 9/2006 Suehiro et al. .............. 362/328
7,273,305 B2 * 9/2007 Fong .......................... 362/520
7,448,783 B2 * 11/2008 Ohkawa ..................... 362/555
2005/0254255 A1 * 11/2005 Hotelling .................... 362/554
2006/0164839 A1 * 7/2006 Stefanov .................... 362/327
2008/0043466 A1 * 2/2008 Chakmakjian et al. ...... 362/237
2008/0291682 A1 * 11/2008 Falicoff et al. .............. 362/310

FOREIGN PATENT DOCUMENTS

JP 2004-516684 A 6/2004
WO WO 02/52656 A1 7/2002

* cited by examiner

*Primary Examiner*—Jacob Y Choi
(74) *Attorney, Agent, or Firm*—Brinks Hofer Gilson Lione

(57) ABSTRACT

An optical member (3) has an entrance bottom surface (6) opposed to LED chips (1) and the entrance bottom surface (6) is configured to receive light from the LED chips (1), an exit top surface (7) opposite to the entrance bottom surface (6) and the exit top surface (7) is configured to emit the light outside the optical member(3), and an outer peripheral side surface (8) disposed between the entrance bottom surface (6) and the exit top surface (7). The outer peripheral side surface (8) has a plurality of circumferentially extending grooves (9) each having a V-shaped sectional configuration. The grooves (9) are set at an angle at which the entered light can be totally reflected inwardly in the optical member (3).

8 Claims, 5 Drawing Sheets

[Fig. 1]
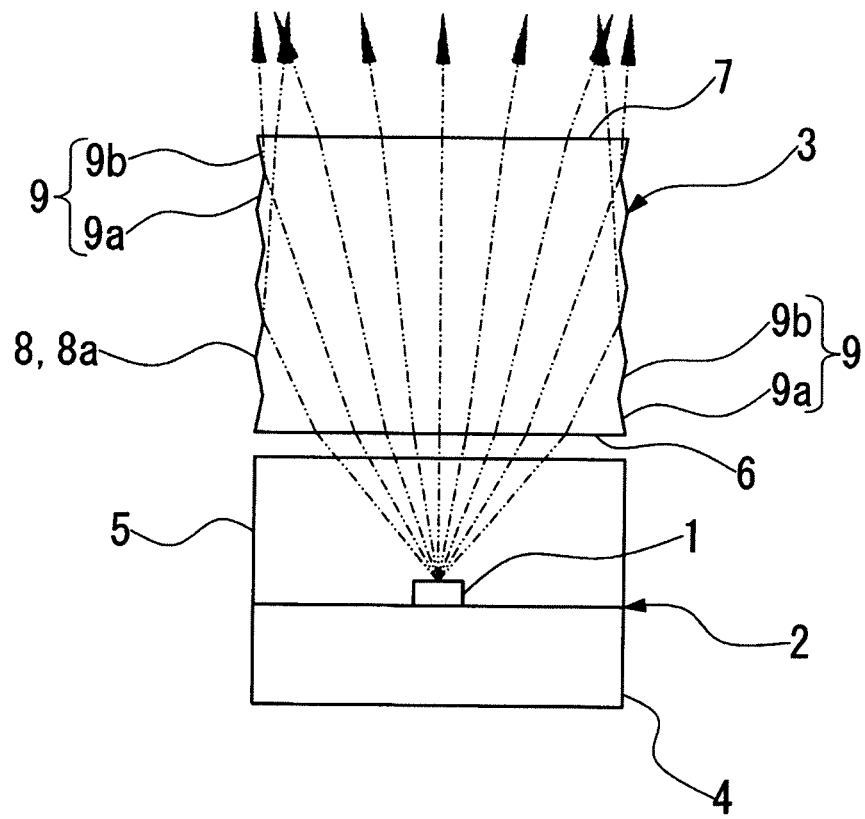
[Fig. 2]
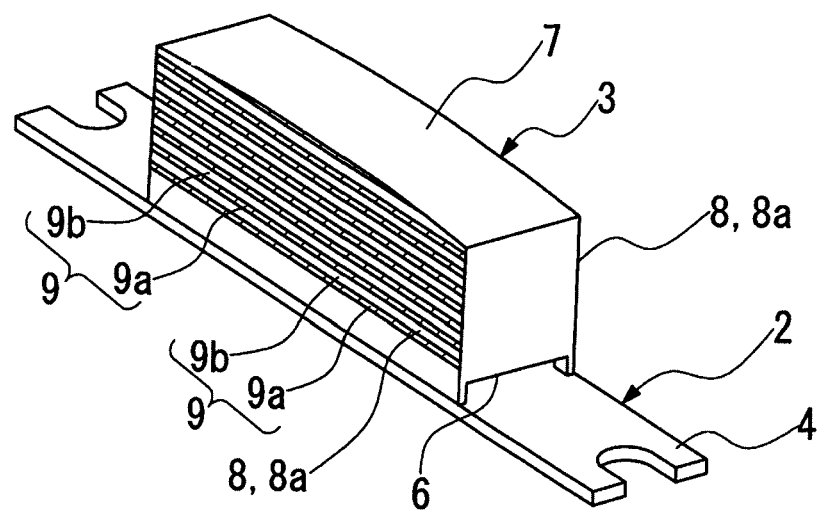

[Fig. 3]
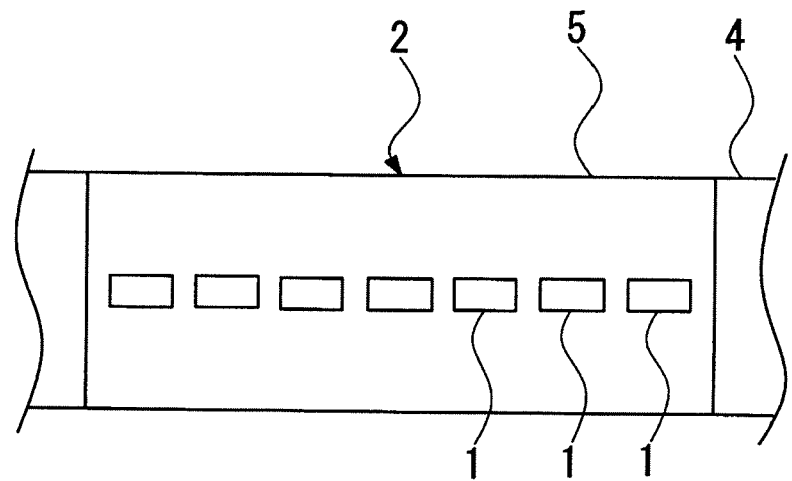
[Fig. 4]
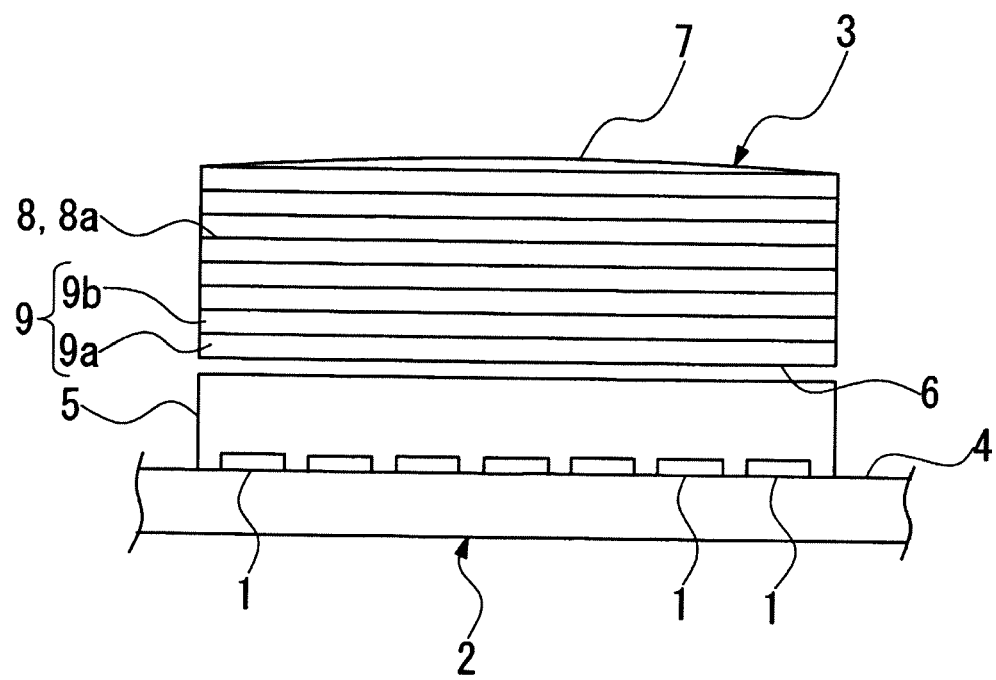

[Fig. 5]
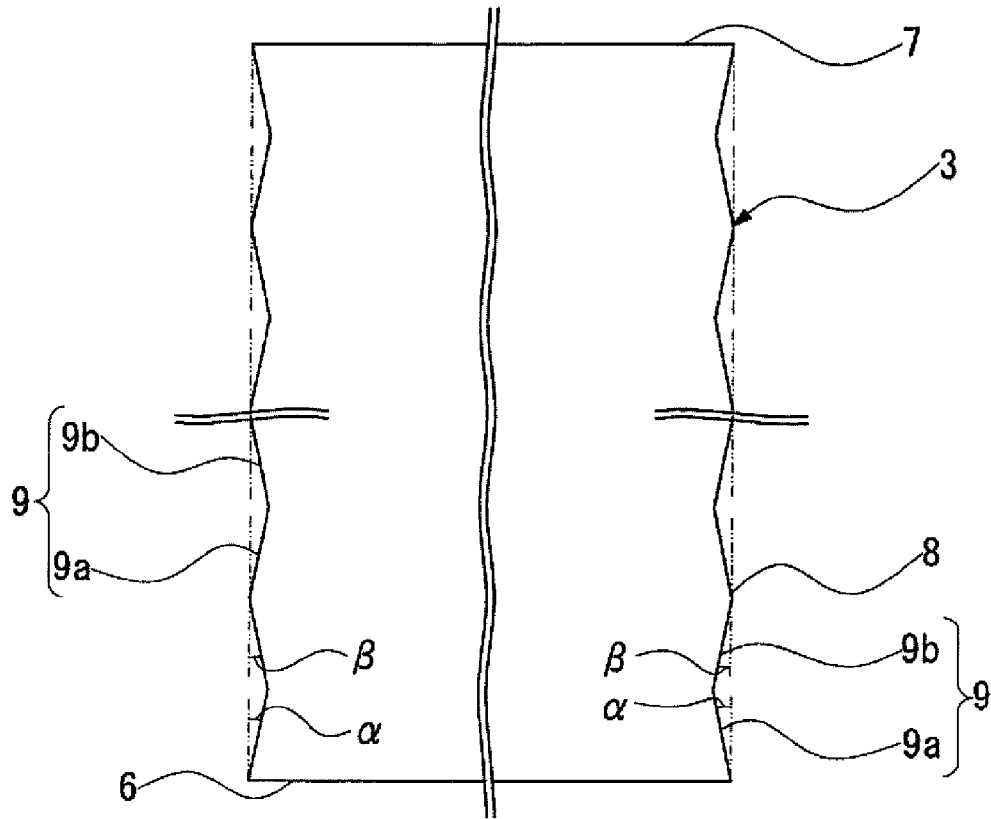
[Fig. 6]
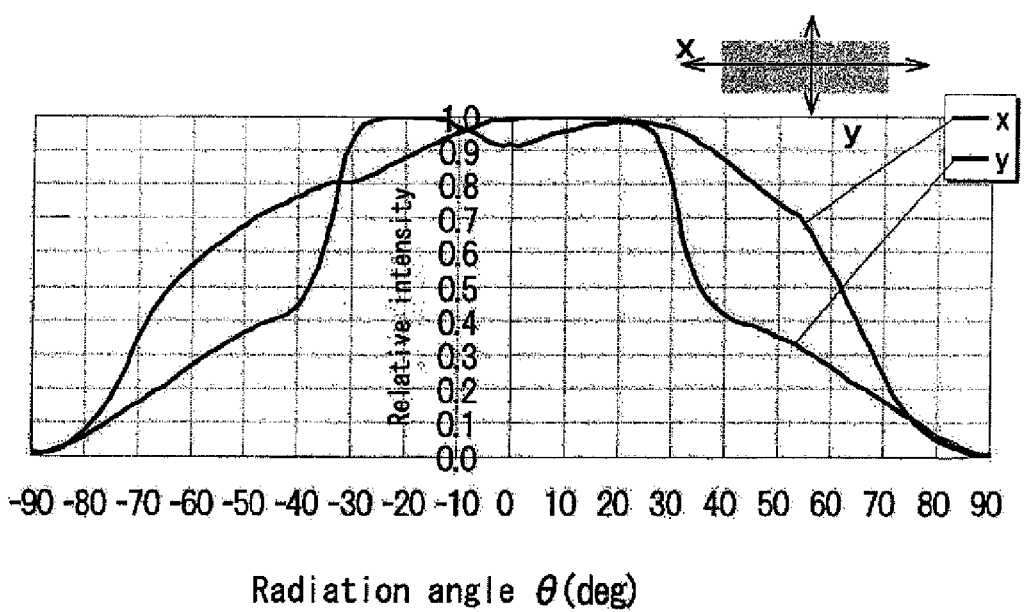
Radiation angle θ (deg)

[Fig. 7]
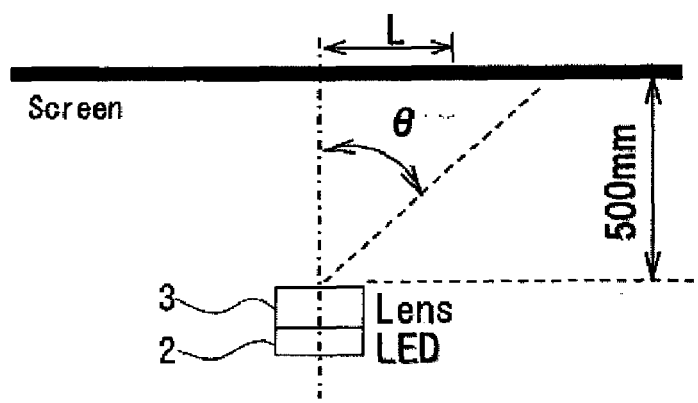
[Fig. 8]
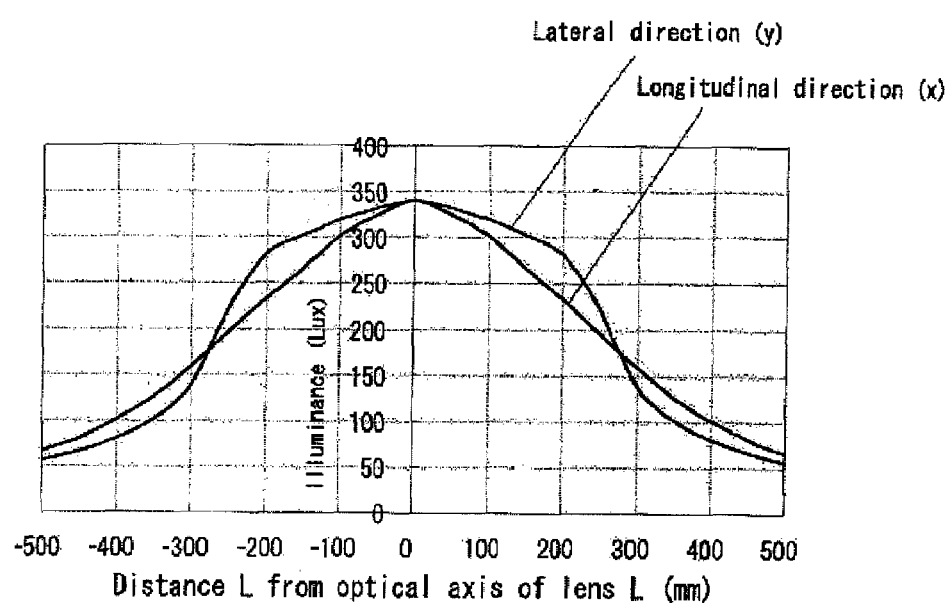

[Fig. 9]
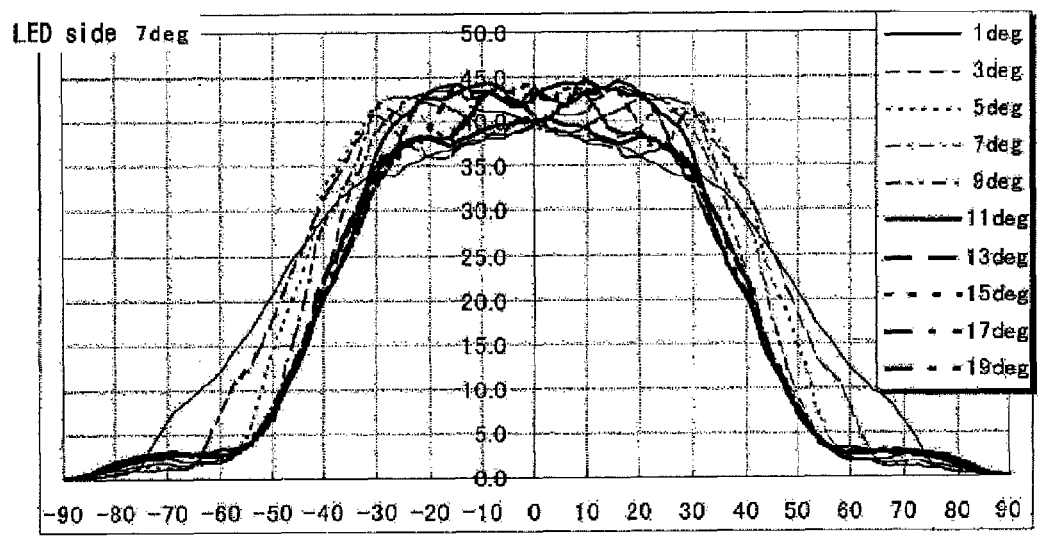
[Fig. 10]
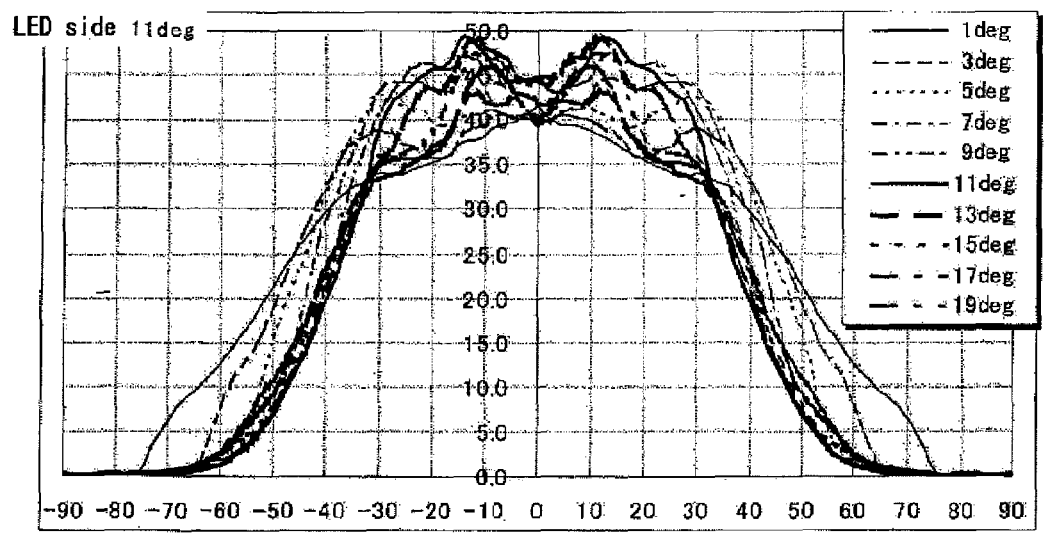

OPTICAL MEMBER AND LIGHTING DEVICE HAVING THE SAME

This application claims priority under 35 U.S.C. §119 to Japanese Patent application No. JP2007-101393 filed on Apr. 9, 2007, the entire contents of which are hereby incorporated by reference.

TECHNICAL FIELD

The present invention relates to an optical member applicable, for example, to general lighting purposes, backlight units of liquid crystal display apparatus, and light sources of projectors. The present invention also relates to a lighting device having the optical member.

RELATED CONVENTIONAL ART

Recently, there have been developed lighting devices such as lighting units using an LED (light-emitting diode) as a light source, backlight units of liquid crystal display apparatus, and light source units of projectors Some of these optical members have already been put to practical use. A lighting device using an LED is usually equipped with a lens for collecting light emitted from the LED. As the lens, a convex lens or a collimator lens is generally used to collect light emitted from the LED.

For example, Published Japanese Translation of PCT International Publication for Patent Application No. 2004-516684 proposes an LED module having a bowl-shaped collimator lens directly above an LED. In this LED module, the collimator lens is provided with a recess that receives light from the LED, a plane surface through which light exits, and a reflecting outer surface that reflects entered light toward the plane surface to collimate the light. The recess has a quadratic curved entrance bottom surface through which light enters, and a side surface.

The above-described related conventional art, however, still has following problems to be solved.

The collimator lens in the conventional art is designed in correspondence to a single light source and therefore cannot uniformly and efficiently collect light from a plurality of light-emitting elements, for example, light from an array of LED elements. In addition, it is necessary to form a complicated configuration such as the recess having a quadratic curved surface in the technique disclosed in Published Japanese Translation of PCT International Publication for Patent Application No. 2004-516684. Accordingly, the conventional collimator lens is difficult to form by machining or molding process and hence suffers from high cost.

SUMMARY OF THE INVENTION

The present invention has been made in view of the above-described problems. Accordingly, an object of the present invention is to provide an optical member that can collect light from not only a single light source but also from an array of a plurality of light-emitting elements and that can be produced at a reduced cost. Another object of the present invention is to provide a lighting device using the optical member.

The present invention provides an optical member having an entrance bottom surface opposed to a light source, an exit top surface opposite to the entrance bottom surface, and an outer peripheral side surface disposed between the entrance bottom surface and the exit top surface. The entrance bottom surface is configured to receive light from the light source. The exit top surface is configured to emit the light outside the optical member after the light is received at the entrance bottom surface and transmitted in the optical member. The outer peripheral side surface has recessed surfaces configured to totally reflect the entered light inwardly.

In the optical member of the present invention, the entrance bottom surface is disposed to face not only a single light source but also a plurality of light sources, and thus, the optical member can receive light from the plurality of light-emitting elements and emit the light through the exit top surface as a single beam of collected light.

Specifically, the recessed surfaces may include surfaces of a plurality of grooves extending circumferentially on the outer peripheral side surface and having a V- or U-shaped sectional configuration.

Grooves having a V- or U-shaped sectional configuration are easy to form by molding process. Accordingly, it is possible to provide a light-collecting member at a reduced cost.

The grooves may each comprise a bottom-side surface disposed at a side closer to the entrance bottom surface and a top-side surface at a side closer to the exit top surface. The bottom-side surface and the top-side surface may be each set at a predetermined angle to an axis perpendicular to the entrance bottom surface.

By properly designing the angles of the bottom-side surface and the top-side surface, exiting light from the optical member can be given appropriate directivity characteristics according to need. For example, exiting light having directivity characteristics with two peaks can be obtained. Particularly, the angle of the bottom-side surface can control the width of exiting light according to the setting of the angle, and the angle of the top-side surface can control the collimator effect according to the setting of the angle.

More specifically, the optical member may have a substantially rectangular parallelepiped shape and a longitudinal direction thereof is configured to be perpendicular to a direction of incidence of light from the light source. The grooves may be formed on a pair of side surfaces of the outer peripheral side surface that extend in the longitudinal direction of the optical member.

The above-described structure is suitable for an arrangement in which a plurality of light-emitting elements are arrayed in a longitudinal direction of the optical member and the optical member collects and emits the light from the light-emitting elements as a single elongated spot of uniform light.

The exit top surface may be a curved surface. That is, by forming the exit top surface from a properly set curved surface such as a concave surface or a convex surface, more various directivity characteristics can be obtained in combination with the light-collecting effect offered by the above-described grooves.

The grooves may be formed all around the outer peripheral side surface. With this arrangement, it is possible to obtain exiting light that is less divergent over the entire circumference thereof and hence possible to obtain a well-defined spot of light.

In addition, the present invention provides a lighting device including a light source and the above-described optical member that is disposed to face the light source at the entrance bottom surface.

Because the lighting device has the above-described optical member, the optical member can uniformly collect and emit the light from a plurality of light-emitting elements as a single beam of light.

In the light source, the light-emitting elements may be LED elements. If LED elements are used as the light source, it is possible to provide a very compact and low-power-consumption lighting device.

The light source may be an array of a plurality of LED elements arranged in a row, and the grooves may be formed on opposite side surfaces of the outer peripheral side surface that extend in a direction in which the LED elements are arranged in a row. That is, the lighting device can efficiently collect light from the LED elements and emit the collected light as a single beam of light.

It is possible according to the present invention to provide a device suitable for use in various lighting purposes such as lighting units, backlight units of liquid crystal display apparatus, and lighting devices of projectors.

One embodiment of the optical member and lighting device according to the present invention will be explained below with reference to FIGS. 1 to 10. It should be noted that the scale of the figures used in the following explanation is properly changed to show each member in a recognizable size.

BRIEF DESCRIPTION OF THE DRAWINGS

FIG. 1 is a diagram for explaining collection and emission of light from a light source in a lighting device according to the present invention.

FIG. 2 is a perspective view of a lighting device according to one embodiment of the present invention.

FIG. 3 is an enlarged top view showing an array of LED elements in a light source used in the lighting device of the embodiment as shown in FIG. 2.

FIG. 4 is an enlarged front view showing the outline of the lighting device of the embodiment.

FIG. 5 is a fragmentary enlarged side view showing an optical member and a light source in the lighting device of the embodiment as shown in FIG. 2.

FIG. 6 is a graph showing a light intensity distribution actually obtained with the lighting device of the embodiment.

FIG. 7 is an explanatory view showing a method of measuring a light intensity distribution and an illuminance distribution in the lighting device of the embodiment.

FIG. 8 is a graph showing an illuminance distribution actually obtained with the lighting device of the embodiment.

FIG. 9 is a graph showing the results of simulation of the light intensity distribution obtained with the lighting device of the embodiment. (bottom-side surface angle: 7°).

FIG. 10 is a graph showing the results of simulation of the light intensity distribution obtained with the lighting device of the embodiment. (bottom-side surface angle: 11°).

DETAILED DESCRIPTION OF THE INVENTION

A lighting device according to one embodiment of the present invention is applicable, for example, to a lighting unit, a backlight unit of a liquid crystal display apparatus or a light source unit of a projector, and has, as shown in FIGS. 1 to 4, an LED array 2 of a plurality of LED elements in a row (as a light source) 1 and an optical member 3 disposed as a collimator lens directly above the LED array 2. It should be noted that FIG. I shows each constituent member simply and on a different scale as compared to the perspective view of FIG. 2 in order to show the layout of each member and the travel direction of light.

The LED array 2 is a white LED array, for example. The white LED array is formed by sealing a plurality of LED elements 1 on a substrate 4 with a resin 5. Each LED element 1 is, for example, a blue (wavelength λ: 470 to 490 nm) LED element or an ultraviolet (wavelength λ: less than 470 nm) LED element, which is formed, for example, by stacking a plurality of semiconductor layers of a gallium nitride compound semiconductor (e.g. InGaN compound semiconductor) on an insulating substrate, e.g. a sapphire substrate.

The resin 5 used to seal the LED elements 1 is prepared by adding, for example, a YAG fluorescent substance into a silicone resin as a main component. The YAG fluorescent substance converts blue or ultraviolet light from the LED elements 1 into yellow light, and white light is produced by color mixing effect. It should be noted that any desired number of LED elements 1 may be mounted on the substrate 4 in a row at a predetermined regular spacing in the longitudinal direction of the substrate 4.

The optical member 3 is a lens having anisotropic directivity, which is formed from an optical material. The optical member 3 has, as shown in FIGS. 1 to 5, an entrance bottom surface 6 opposed to the LED elements 1, and the optical member 3 is configured to receive light from the LED elements at the entrance bottom surface 6. The optical member 3 further has an exit top surface 7 opposite to the entrance bottom surface 6 and the exit top surface 7 is configured to emit the light outside the optical member 3, and an outer peripheral side surface 8 disposed between the entrance bottom surface 6 and the exit top surface 7. As the optical material, any of various materials may be used according to the use application, cost, etc., such as resin, e.g. acrylic resin, or polycarbonate resin, and glass materials.

The optical member 3 has a substantially rectangular parallelepiped shape elongated in the longitudinal direction of the LED array 2. The optical member 3 has a plurality of grooves 9 formed on the outer peripheral side surface 8. The grooves 9 extend circumferentially on the outer peripheral side surface 8 and have a V-shaped sectional configuration respectively with a groove angle and the grooves 9 are configured to efficiently totally reflect the light inwardly in the optical member 3. In this embodiment, in particular, the grooves 9 are formed on a pair of longitudinally extending side surfaces 8a of the outer peripheral side surface 8. That is, the grooves 9 are formed on side surfaces 8a of the outer peripheral side surface 8 that extend in the direction in which the LED elements 1 are arranged in a row.

The exit top surface 7 has, as shown in FIG. 4, a linear curved surface having a predetermined curvature. In this embodiment, the radius of curvature is 150 mm.

The grooves 9 each comprise a bottom-side surface 9a disposed at a side closer to the entrance bottom surface 6 and a top-side surface 9b at a side closer to the exit top surface 7. The bottom-side surface 9a and the top-side surface 9b are each set at a predetermined angle to an axis perpendicular to the entrance bottom surface 6. The angles of the bottom-side surface 9a and the top-side surface 9b constitute an apex angle of each of the grooves 9 is sufficiently large and is configured to totally reflect light in the optical member 3 inwardly thereof. For example, the angle α of the bottom-side surface 9a is set at 5°, and the angle β of the top-side surface 9b is set at 6°.

It should be noted that the angle α of the bottom-side surface 9a is preferably not less than 3 and the angle β of the top-side surface 9b is preferably not more than 20°. The reason for this is as follows. If the angle α of the bottom-side surface 9a is less than 3° or the angle β of the top-side surface 9b is more than 20°, a sufficient light-collecting effect cannot be obtained, and the light utilization efficiency degrades to a considerable extent.

FIG. 6 shows the results of measurement of a light intensity distribution actually obtained with the lighting device of this embodiment. In this measurement, as shown in FIG. 7, illuminating light from the lighting device was applied to a screen spaced from the optical member 3 by a distance of 500 mm, and the relative intensity of light with respect to the radiation angle θ was measured. The optical member 3 used in the measurement was such that the angle α of the bottom-side surface 9a was 5° and the angle β of the top-side surface 9b was 6°. It should be noted that the x direction is the longitudinal direction of the optical member 3 and the y direction is the lateral direction of the optical member 3.

As will be understood from the results of the measurement, the light intensity is widely distributed in the long-side direction (longitudinal direction), whereas in the short-side direction (lateral direction), the light intensity remains substantially constant at a high level within a radiation angle range of about ±30° and rapidly lowers as the radiation angle increases beyond that range. Consequently, trapezoidal directivity characteristics can be obtained as a whole. Thus, it is possible to obtain exiting light of high directivity close to collimated light.

FIG. 8 shows the results of measurement of an illuminance distribution actually obtained with the lighting device of this embodiment. In this measurement, as shown in FIG. 7, illuminating light from the lighting device was applied to a screen spaced from the optical member 3 by a distance of 500 mm, and the illuminance with respect to the distance L from the optical axis of the optical member 3 was measured. As will be understood from the results of the measurement, in the longitudinal direction, the illuminance decreases at a substantially constant rate from the peak at the optical axis, whereas in the lateral direction, the illuminance decreases at a low rate as the distance increases up to about 200 mm. Thus, trapezoidal illuminance distribution characteristics can be obtained as a whole.

FIG. 9 is a graph showing the results of simulation measurement of the light intensity distribution in the lateral direction in a case where the angle α of the bottom-side surface 9a was set at 7° and the angle β of the top-side surface 9b was changed from 1° to 19° in units of 2°. The simulation results also reveal that the light intensity remains substantially constant at a high level within a radiation angle range of about ±30° and rapidly lowers as the radiation angle increases beyond that range, and thus trapezoidal directivity characteristics can be obtained as a whole.

FIG. 10 is a graph showing the results of simulation measurement of the light intensity distribution in the lateral direction in a case where the angle α of the bottom-side surface 9a was set at 11° and the angle β of the top-side surface 9b was changed from 1° to 19°in units of 2°. The simulation results reveal that a light intensity distribution having two peaks can be obtained depending on the angle β of the top-side surface 9b. The lighting device capable of obtaining the directivity characteristics having two peaks is suitable for use, for example, in a display apparatus for a car navigation system that requires high visibility in two directions toward driver's and passenger's seats, or in a lighting unit that needs to apply locally intense light in two directions.

As will be understood from the above, the optical member 3 can control the travel direction of exiting light in the lateral direction thereof (i.e. the direction perpendicular to the pair of side surfaces 8a that are provided with the grooves 9) to collect light. Accordingly, it is possible to obtain light having different directivity characteristics in the longitudinal and lateral directions.

More specifically, it is possible to obtain exiting light that is converged in the lateral direction and that is divergent to a certain extent in the longitudinal direction. In the case of the LED array 2 in which a plurality of light-emitting elements are arrayed in one direction, in particular, light from the LED array 2 can be uniformly and efficiently collected in the form of an elongated light spot as a whole by disposing the longitudinal direction of the optical member to extend in the array direction of the LED array 2.

A variety of directivity characteristics can be obtained by variously combining together the above-described angles of the bottom-side surface 9a and the top-side surface 9b. Particularly, the above-described angle of the bottom-side surface 9a can control the width of exiting light according to the setting of the angle, and the angle of the top-side surface 9b can control the collimator effect according to the setting of the angle.

It should be noted that the present invention is not necessarily limited to the foregoing embodiment but can be modified in a variety of ways without departing from the scope of the present invention.

For example, the grooves 9, which have a V-shaped sectional configuration in the above-described embodiment, may have a U-shaped sectional configuration. That is, the top-side surface 9b and the bottom-side surface 9a, which are plane surfaces in the foregoing embodiment, may be curved surfaces. The grooves 9 may also be replaced with an emboss hologram (relief type) comprising textured irregularities.

Although the grooves 9 in the foregoing embodiment are formed on the pair of side surfaces 8a, they may be formed all around the outer peripheral side surface 8, including the other side surfaces. In this case, because the grooves 9 are formed all around the outer peripheral side surface 8, it is possible to obtain exiting light having high directivity over the entire circumference and hence possible to obtain a well-defined spot of light. Accordingly, if the optical member 3 has a substantially rectangular parallelepiped shape, a well-defined rectangular light spot can be obtained. If the optical member 3 has a circular columnar shape or a triangular columnar shape, a well-defined circular or triangular light spot can be obtained.

Although the exit top surface 7 in the foregoing embodiment is a convexly curved surface, it may be a concavely curved surface according to the desired directivity characteristics or the like. Although the exit top surface 7 in the foregoing embodiment is a curved surface having a predetermined curvature in the longitudinal direction, it may be a curved surface having a predetermined curvature in the lateral direction. Further, the exit top surface 7 may be a quadratic curved surface having curvatures in both the longitudinal and lateral directions. The exit top surface 7 may be formed into a Fresnel lens configuration. In this case, it is possible to prevent curvature of exiting light due to the edge of the exit top surface 7. Thus, because the exit top surface 7 can be formed from a properly set curved surface such as a concave surface or a convex surface, more various light-collecting characteristics can be obtained in combination with the light-collecting effect offered by the grooves 9 of the side surfaces 8a.

Although the above-described LED array 2 is a white LED array, it may be an array of LED elements emitting light of other wavelength, e.g. red, blue or green LED elements or a combination of these LED elements.

The optical member 3 of the present invention is suitable for use with an LED array 2 having a plurality of LED elements. However, the optical member 3 may also be applied to a light source equipped with a single LED element 1.

Although the optical member 3 is suitable for use with a light source using an LED element or LED elements as stated above, it may also be applied to other light sources, for example, fluorescent lamps, cold-cathode tubes, or electric bulbs.

In the foregoing embodiment, the angles of the top- and bottom-side surfaces 9b and 9a of one side surface 8a are set the same as the angles of those of the other side surface Sa so that the top- and bottom-side surfaces 9b and 9a are symmetric between the pair of side surfaces 8a. However, the angles of the top-and bottom-side surfaces 9b and 9a may be set individually for each side surface 8a. It is also possible to gradually change the angles α, λ, width, etc. of the top- and bottom-side surfaces 9b and 9a for each of the grooves 9 arranged side by side from the entrance bottom surface 6 toward the exit top surface 7, or to set the angles α, β, width, etc. of the top- and bottom-side surfaces 9b and 9a individually for each groove 9.

The invention claimed is:

1. A lighting device comprising:
   a light source that is an array comprising a plurality of light-emitting diode elements arranged in a row; and
   an optical member having a substantially rectangular parallelepiped shape elongated in a longitudinal direction of the array, the optical member comprising:
   an entrance bottom surface opposed to the light source and configured to receive light from the light source;
   an exit top surface opposite to the entrance bottom surface and configured to emit the light outside the optical member;
   an outer peripheral side surface disposed between the entrance bottom surface and the exit top surface; and
   a plurality of recessed surfaces formed on the outer peripheral side surface and extending in the longitudinal direction of the array in which the light-emitting elements are arranged, the plurality of recessed surfaces configured to totally reflect the entered light inwardly, the plurality of recessed surfaces comprising surfaces of a plurality of grooves each having a V-shaped sectional configuration, the grooves being formed on a pair of opposite side surfaces of the outer peripheral side surface and each extending in the longitudinal direction of the array.

2. The lighting device of claim 1, in which the grooves each comprise a bottom-side surface disposed at a side closer to the entrance bottom surface and a top-side surface at a side closer to the exit top surface, the bottom-side surface and the top-side surface each being set at a predetermined angle relative to an axis perpendicular to the entrance bottom surface.

3. The lighting device of claim 1, in which the exit top surface of the optical member is a curved surface.

4. The lighting device of claim 1, the plurality of recessed surfaces formed on the outer peripheral side surface and extending in the longitudinal direction of the array, further comprising the recessed surfaces formed on the outer peripheral side surface and extending horizontally perpendicular to the longitudinal direction of the array.

5. A lighting device comprising:
   a light source that is an array comprising a plurality of light-emitting diode elements arranged in a row; and
   an optical member having a substantially rectangular parallelepiped shape elongated in a longitudinal direction of the array, the optical member comprising:
   an entrance bottom surface opposed to the light source and configured to receive light from the light source;
   an exit top surface opposite to the entrance bottom surface and configured to emit the light outside the optical member;
   an outer peripheral side surface disposed between the entrance bottom surface and the exit top surface; and
   a plurality of recessed surfaces formed on the outer peripheral side surface and extending in the longitudinal direction of the array in which the light-emitting elements are arranged, the plurality of recessed surfaces configured to totally reflect the entered light inwardly, the plurality of recessed surfaces comprising surfaces of a plurality of grooves each having a U-shaped sectional configuration, the grooves being formed on a pair of opposite side surfaces of the outer peripheral side surface and each extending in the longitudinal direction of the array.

6. The lighting device of claim 5, in which the grooves each comprise a bottom-side surface disposed at a side closer to the entrance bottom surface and a top-side surface at a side closer to the exit top surface, the bottom-side surface and the top-side surface each being set at a predetermined angle relative to an axis perpendicular to the entrance bottom surface.

7. The lighting device of claim 5, in which the exit top surface of the optical member is a curved surface.

8. The lighting device of claim 5, the plurality of recessed surfaces formed on the outer peripheral side surface and extending in the longitudinal direction of the array, further comprising the recessed surfaces formed on the outer peripheral side surface and extending horizontally perpendicular to the longitudinal direction of the array.

* * * * *